Aug. 18, 1925.
G. VINCENT ET AL
1,550,129
FRUIT STERILIZING APPARATUS
Filed Nov. 14, 1922    2 Sheets-Sheet 1
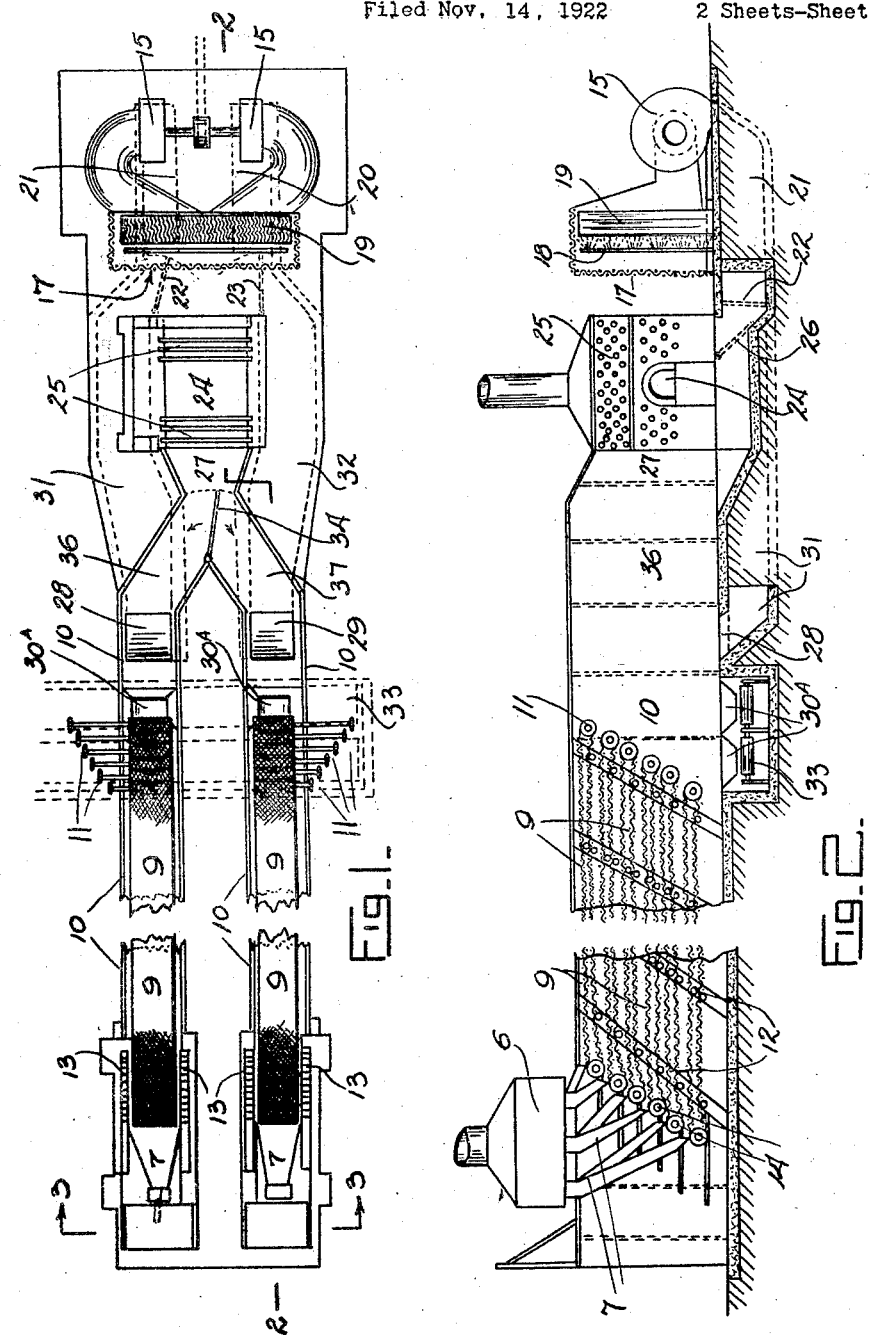

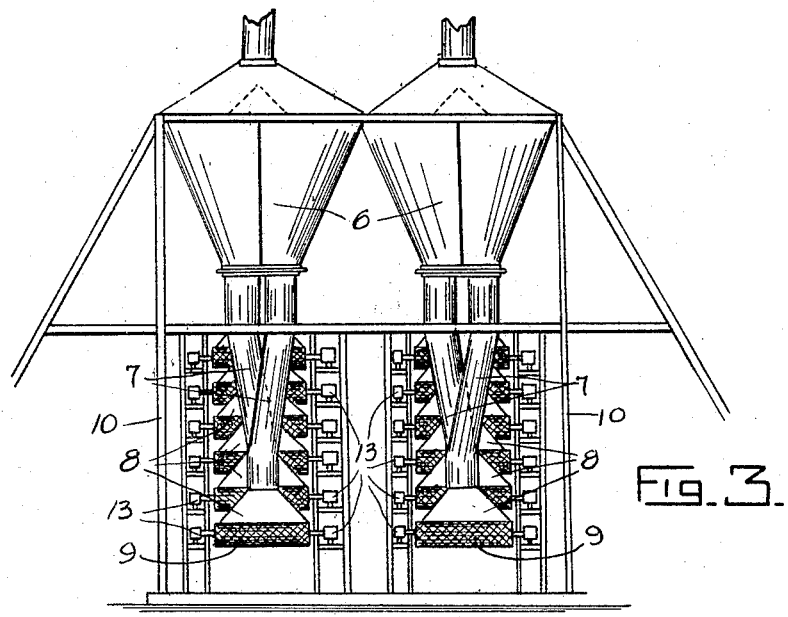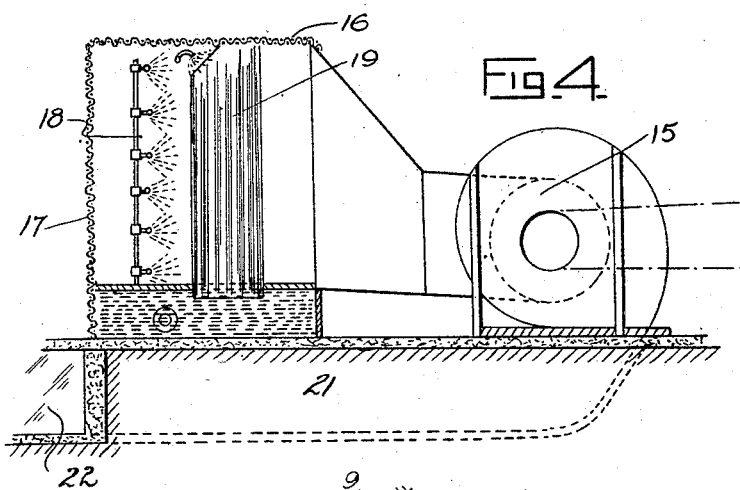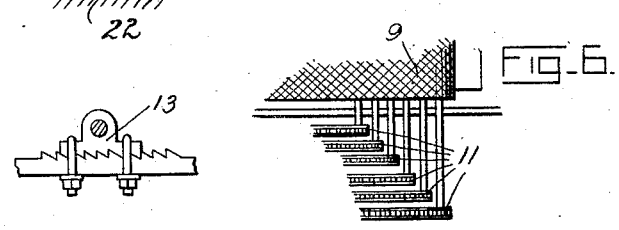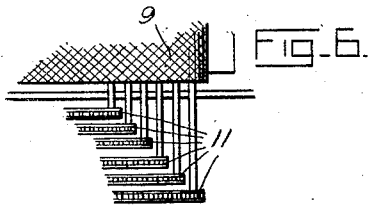

Patented Aug. 18, 1925.

1,550,129

UNITED STATES PATENT OFFICE.

GEORGE VINCENT, OF DARLINGHURST, SYDNEY, AND WILLIAM RUPERT CATER, OF LEETON, NEW SOUTH WALES, AUSTRALIA.

FRUIT-STERILIZING APPARATUS.

Application filed November 14, 1922. Serial No. 600,934.

*To all whom it may concern:*

Be it known that we, GEORGE VINCENT, a subject of the King of Great Britain, residing at Darlinghurst, Sydney, in the State of New South Wales, Commonwealth of Australia, and WILLIAM RUPERT CATER, a subject of the King of Great Britain, residing at Leeton, in said State, have invented certain new and useful Improvements in Fruit Sterilizing Apparatus, of which the following is a specification.

This invention relates to the sterilization or dehydration of fruits, vegetables, and other alimentary products and subsequently cooling them prior to stemming, grading, and/or packing. Our invention has especial reference to the treatment of fruits such as raisins, currants and the like. The main object we have had in view has been provision for treating the products effectively by first applying thereto heated air and subsequently cooled air, with a minimum of handling and expenditure of labor.

According to the invention, the products to be treated are passed into a feed hopper from which depend a series of shoots or ducts each of which leads to a corresponding conveyor. These conveyors are positioned in a suitable tunnel or way in communication with the heated or cooled air as hereinafter explained. The conveyors are superimposed with air spaces between and have belts of fine wire netting, or other suitable open material, their feed ends being so arranged that the depending shoots can readily deliver the products to the respective conveyors. While the feeding is in progress the conveyors are caused to travel at a slow speed, proportionate to the feed, until the whole upper portions of the belts are supplied with the products, when their travel may be stopped until the process is completed. At the inner end of the tunnel is a passage communicating with two branch passages controlled by a two-way gate or valve. One branch leads to a heated air duct and the other to a cold air duct. The heated air duct communicates with tubes or other surfaces adapted to be heated by a suitable type of furnace, atmospheric air being forced therethrough by a centrifugal or other type of blower. The gate controlling the heated air being open, the air at a temperature of about 140° to 180° Fah. is forced through the tunnel and on and around the products supported on the conveyors and discharged at the opposite end of the tunnel, the velocity of the air not being such as will force the products from the conveyors. After sufficient time has elapsed to effect the sterilization or dehydration, varying according to the particular product being treated, the gate is thrown over to close the heated air duct and open the cold air duct. This air is preferably first cooled and washed by passing it through water sprays or the like or it may be at atmospheric temperature. The air may also be washed by being passed through water sprays or scrubbers either prior or subsequent to being heated.

After the sterilized products have been cooled the travel of the conveyors may be continued and the treated products discharged into hoppers at opposite end of the tunnel from the feed hoppers, or they may have a reverse motion imparted to them, and the contents discharged into a delivery hopper or hoppers at the same end as the feed hoppers for further treatment, if necessary, or grading and packing.

But in order that our invention may be more clearly comprehended, we will now refer to the accompanying two sheets of drawings in which, Figure 1 is a sectional plan view of our apparatus, and Figure 2, a sectional elevation on line 2—2, Figure 1.

Figure 3 is an enlarged end sectional view on line 3—3, Figure 1.

Figure 4 is a cross sectional elevation of the air washing apparatus.

Figure 5 is a detail elevation of one of the bearings 13.

Figure 6 is a detail plan of one of the conveyor belts and of the chain sprocket gearing.

The same numerals indicate the same or corresponding parts throughout the drawings.

6, 6, are the feed hoppers provided with delivery pipes or chutes 7, the lower end of each chute terminating in spreaders 8 which deliver the material to be treated onto the conveyor belts 9, 9, which are composed of fine wire mesh or the like. Each belt 9 is positioned so that the material is carried along the tunnel or closed passage way 10 in an approximately horizontal travel, said belts being revolved by chain sprocket gearing 11 or the like. 12 represents idler rollers placed throughout the length of the tunnel 10 to assist in supporting the respective belts 9. 13 are take up bearings for the return rollers 14 so that the several belts 9 can always be kept taut. Preferably we have two tunnels or passage ways 10 positioned alongside one another as shown. Air is drawn into the apparatus by the fans 15 through the washing or scrubbing chamber 16 composed of a wire mesh screen 17, water pipes with suitable spray nozzle 18 and a water eliminator or condenser consisting of a number of vertically positioned corrugated sheets or plates 19 placed adjacent to one another in parallel longitudinally so that the moisture laden air, on being drawn between the plates, deposits a large proportion of the moisture thereon. The fans 15 then force the washed air along the passage ways 20 and 21, each passage way being provided with an adjustable door or doors 22 and 23. 24 represents the furnace with flue tubes 25, the adjustable door 26 being provided for diverting a quantity or all of the air through the furnace thereby heating same. The heated air is then discharged through the mixing passage or chamber 27, the open end of which is provided with an adjustable door 34 so that the air may be led through passages or ducts 36 or 37 to either or both of the treating tunnels 10 and at the entrance of each tunnel cold air passing up through the openings 28 and 29 from the cold air passages 31 and 32 may mix with the heated air before passing along through the tunnels 10, or with adjustable door 34 closed the cold air is mostly applied directly. The passages or ducts 36 and 37 form mixing chambers and each has a sectional area substantially equal to the area of the discharge outlet or outlets of the fan or fans. This has the effect of eliminating air eddies and ensures a correct velocity pressure or head of air substantially as at the fan outlet or outlets. After the products are carried along on the belts 9, 9, they are discharged into hoppers 30ª which deposit them on to belt conveyors 33 for removal to the packing or storage rooms.

We claim:—

1. In apparatus for sterilizing or dehydrating and cooling fruits and other products, the combination with a treating tunnel of superposed open work conveyors therein, passages leading to said tunnel in communication respectively with ducts into which heated or cold air is forced by a fan or fans, said passages being controlled by an adjustable two way gate or door, and a furnace capable of heating the air prior to entering the heated air duct substantially as described and illustrated.

2. In apparatus for sterilizing or dehydrating and cooling fruits and other products as claimed in claim 1, the combination therewith of means for washing the air substantially as described and as illustrated.

3. In apparatus for sterilizing or dehydrating and cooling fruits and other products as claimed in claim 1, the combination therewith of a series of superposed conveyor belts of wire mesh adapted to be moved horizontally by sprocket gearing, idler rollers to partially support said belts and take up bearings for the return rollers substantially as described and illustrated.

4. In apparatus for sterilizing or dehydrating and cooling fruits and other products, the combination with a treating tunnel in which the products are carried along by conveying means, of passages leading to said tunnel and in communication with ducts into which heated or cold air is forced by a fan or fans, said passages being controlled by a two way gate or door, a mixing chamber whose sectional area is substantially equal to the discharge outlet of the fan or fans, said mixing chamber being positioned between the entrance to the tunnel and a furnace capable of heating the air substantially as described.

In testimony whereof we have hereunto set our hands.

GEORGE VINCENT.
WILLIAM RUPERT CATER.